(12) United States Patent
Ali

(10) Patent No.: US 10,589,671 B1
(45) Date of Patent: Mar. 17, 2020

(54) 3D PRINTED AIR BLADDER MESH ELASTOMER MATERIAL

(71) Applicant: Honda Motor Co., Ltd., Tokyo (JP)

(72) Inventor: Zainab I. Ali, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/186,128

(22) Filed: Nov. 9, 2018

(51) Int. Cl.
*G08B 21/00* (2006.01)
*B60Q 9/00* (2006.01)
(Continued)

(52) U.S. Cl.
CPC .............. *B60Q 9/00* (2013.01); *B29C 64/10* (2017.08); *B32B 3/12* (2013.01); *B32B 3/266* (2013.01);
(Continued)

(58) Field of Classification Search
CPC .......... B60N 2/914; B60N 2/665; B60N 2/00; B60N 2/24; B60N 2/64; B60N 2/66; B60N 2/976; B60N 2/686; B60N 2/38; B60N 2/5635; B60N 2/5657; B60N 2/5692; B60N 2/5816; B60N 2/5825; B60N 2/585; B60N 2/5883; B60N 2/688; B60N 2/7041; B60N 2/4221; B60N 2/42736; B60N 2/62; B29C 44/588; B29C 33/10; B29C 44/146; B29C 44/3438; A47C 1/023; A47C 31/02; A47C 31/126; A47C 7/14; A47C 7/282; A47C 7/46; A47C 7/744; A47C 4/54; A47C 7/742; A47C 31/023; A47C 7/029; A47C 7/18; A47C 7/185; A47C 9/10; A61H 9/00; B60G 2200/18; B60G 2200/182; B60G 2200/462; B60G 2204/416; B60G 2206/11; B60G 2300/07; B60G 2300/124; B60G 3/20; B60G 3/202; B60G 7/005; B62D 23/005; Y02T 50/46; B29K 2105/04; Y10S 425/812; Y10S 297/03; Y10S 224/924; Y10S 297/08; Y10S 408/709; B64D 11/0601; B64D 11/0604; B64D 11/0619; B64D 11/0627; B64D 11/0641; B64D 11/0647; B64D 11/0696; A01K 97/08; A41D 15/04; A41D 3/08; A45C 7/0095; A45F 2004/026; A45F 4/12;
(Continued)

(56) References Cited

U.S. PATENT DOCUMENTS 6,109,688 A * 8/2000 Wurz ...................... A47C 7/744
297/180.13
9,126,519 B2 * 9/2015 Uebelacker .......... B60N 2/7011
(Continued)

*Primary Examiner* — Daniel Previl
(74) *Attorney, Agent, or Firm* — Rankin, Hill & Clark LLP

(57) ABSTRACT

A three-dimensional printed vehicle component including an integral lattice and one or more fluid chambers including an aperture for accessing an interior of the chamber. The chamber can be expanded and contracted by delivering a fluid via the aperture to and from the interior of the chamber. The vehicle component can include top and bottom sheets sandwiching the lattice and chambers. The top and bottom sheets can be integrally printed with the lattice and chambers, or can be attached thereto with an adhesive. The duration, number, frequency, and intensity of such delivery can be controlled to provide various haptic sensations to a vehicle occupant. The haptic sensation can include a massage, an indication, or a firmness of touch.

20 Claims, 5 Drawing Sheets

(51) Int. Cl.
*B33Y 80/00* (2015.01)
*B32B 3/26* (2006.01)
*B32B 3/12* (2006.01)
*B29C 64/10* (2017.01)
*B60N 2/90* (2018.01)
*B33Y 10/00* (2015.01)
*B29L 31/30* (2006.01)

(52) U.S. Cl.
CPC ........... *B33Y 80/00* (2014.12); *B29L 2031/30* (2013.01); *B32B 2605/00* (2013.01); *B33Y 10/00* (2014.12); *B60N 2/90* (2018.02); *B60N 2002/981* (2018.02)

(58) Field of Classification Search
CPC .. A47G 9/0207; A47G 9/062; A61B 5/02055; A61B 5/021; A61B 5/02416; A61B 5/0402; A61B 5/053; A61B 5/0816; A61B 5/14551; A61B 5/6817; A61F 5/05833; A61F 5/56; A61G 2210/70; A61G 5/1043; A61G 5/1045; A61G 7/05784; A61M 16/0605; A61M 16/0666; A61M 16/208; B23C 3/055; B23Q 1/5456; B60R 21/045; B63B 35/28; B63B 35/7906; B63B 3/13; B65D 88/22; F16K 31/58; Y10T 408/567; Y10T 409/307672; Y10T 409/308512
USPC ... 340/425.5, 427, 428, 429, 426.11, 426.23, 340/426.26, 426.27, 426.31, 431, 432, 340/436, 506, 539.21
See application file for complete search history.

(56) References Cited

U.S. PATENT DOCUMENTS

| | | | |
|---|---|---|---|
| 2005/0269858 A1* | 12/2005 | Leutert | A47C 4/54 297/452.41 |
| 2016/0229126 A1* | 8/2016 | Every | B33Y 80/00 |
| 2016/0236600 A1* | 8/2016 | Citron | B60N 2/5825 |
| 2018/0009335 A1* | 1/2018 | Laugt | B60N 2/70 |
| 2018/0043805 A1* | 2/2018 | Baek | B29D 99/0092 |

* cited by examiner

3D PRINTED AIR BLADDER MESH ELASTOMER MATERIAL

BACKGROUND

Seats with massage capabilities require the integration of premade air bladders and tubes into a foam layer. In order to accomplish such integration, portions of the foam are cut out to accommodate for the size and positioning of various air bladders and tubes within the foam layer. The air bladders and tubes are then arranged in the cut out sections of the foam layer. This process requires precise cutting of the foam, inlaying of the bladders and tubes, and making attachments (typically adhesive) between the foam, bladders and tubes, thus resulting in labor costs spent on assembly and monetary expenditures spent on procuring the various components.

BRIEF DESCRIPTION

According to one aspect, a printed vehicle component includes a network of interconnected braces defining an array of cells, and a fluid chamber arranged within the network and including an aperture providing access to an interior of the chamber. The network and the chamber are integrally formed of a flexible polymer material.

According to another aspect, a printed vehicle component includes a first sheet, a second sheet, a network of interconnected braces, and a fluid chamber. The network of interconnected braces define an array of cells, and is sandwiched between and contacts the first sheet and the second sheet. The fluid chamber is arranged within the network and includes an aperture providing access to an interior of the chamber. The network, the first sheet, the second sheet, and the chamber are integrally formed of a flexible polymer material.

According to another aspect, a method is provided for providing a haptic sensation to a vehicle occupant from a printed component. The printed component includes a network of interconnected braces defining an array of cells, and a chamber arranged within the network and including an aperture providing access to an interior of the chamber. The network and the chamber are integrally formed of a flexible polymer material. The method includes transporting a fluid to the interior of the chamber via the aperture to thereby expand the chamber from a first volume to a second volume that is larger than the first volume; and transporting the fluid from the interior of the chamber via the aperture such that the chamber contracts from the second volume to the first volume. The occupant feels the chamber expanding from the first volume to the second volume and contracting from the second volume to the first volume.

According to another aspect, a method is disclosed for providing a haptic sensation to a vehicle occupant from a printed component. The printed component includes a first sheet, a second sheet, a network of interconnected braces, and a chamber. The network of interconnected braces defines an array of cells, and is sandwiched between and contacts the first sheet and the second sheet. The chamber is arranged within the network and includes an aperture providing access to an interior of the chamber. The network, the first sheet, the second sheet, and the chamber are integrally formed of a flexible polymer material. The method includes transporting a fluid to the interior of the chamber via the aperture to thereby expand the chamber from a first volume to a second volume that is larger than the first volume. The fluid is transported from the interior of the chamber via the aperture such that the chamber contracts from the second volume to the first volume. The occupant feels the chamber expanding from the first volume to the second volume and contracting from the second volume to the first volume.

According to another aspect, method of making a vehicle assembly includes three dimensionally printing with a flexible polymer material to produce a printed component. The printed component includes a network of interconnected braces defining an array of cells, and a chamber arranged within the network and including an aperture providing access to an interior of the chamber. The network and the chamber are integral with one another. The printed component is arranged over a substrate, and the printed component is covered with a top layer.

According to another aspect, a method of making a vehicle assembly, includes three dimensionally printing a component with a flexible polymer material to produce a printed component. The printed component includes a first sheet, a second sheet, a network of interconnected braces, and a chamber. The network of interconnected braces defines an array of cells, and is sandwiched between and contacts the first sheet and the second sheet. The chamber is arranged within the network and includes an aperture providing access to an interior of the chamber. The network, the first sheet, the second sheet, and the chamber are integral with one another. The method includes arranging the printed component over a substrate, and covering the printed component with a top layer.

DETAILED DESCRIPTION

Figure 1:
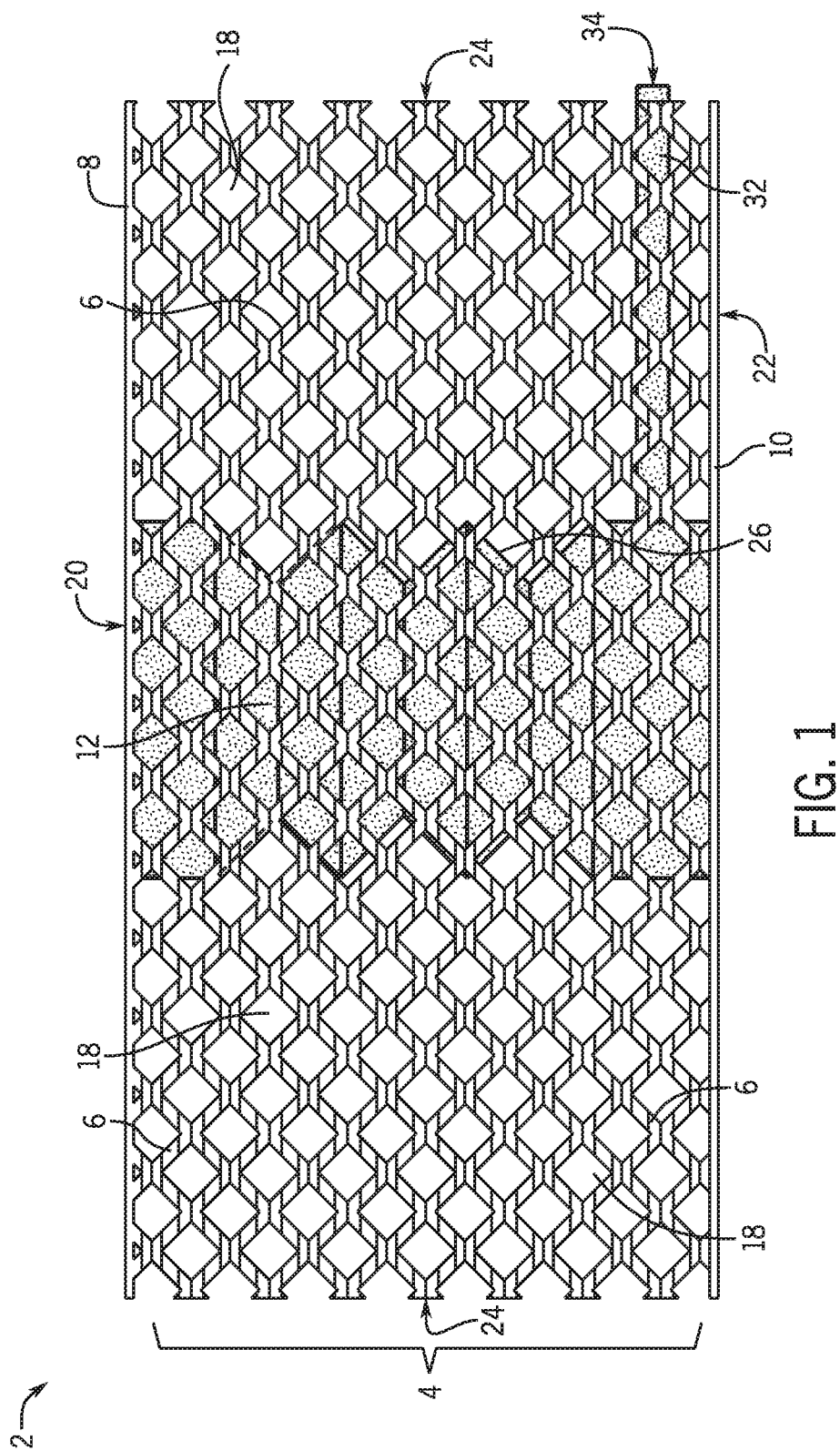
FIG. 1 is a side view of a printed vehicle component according to the present subject matter.
Figure 2:
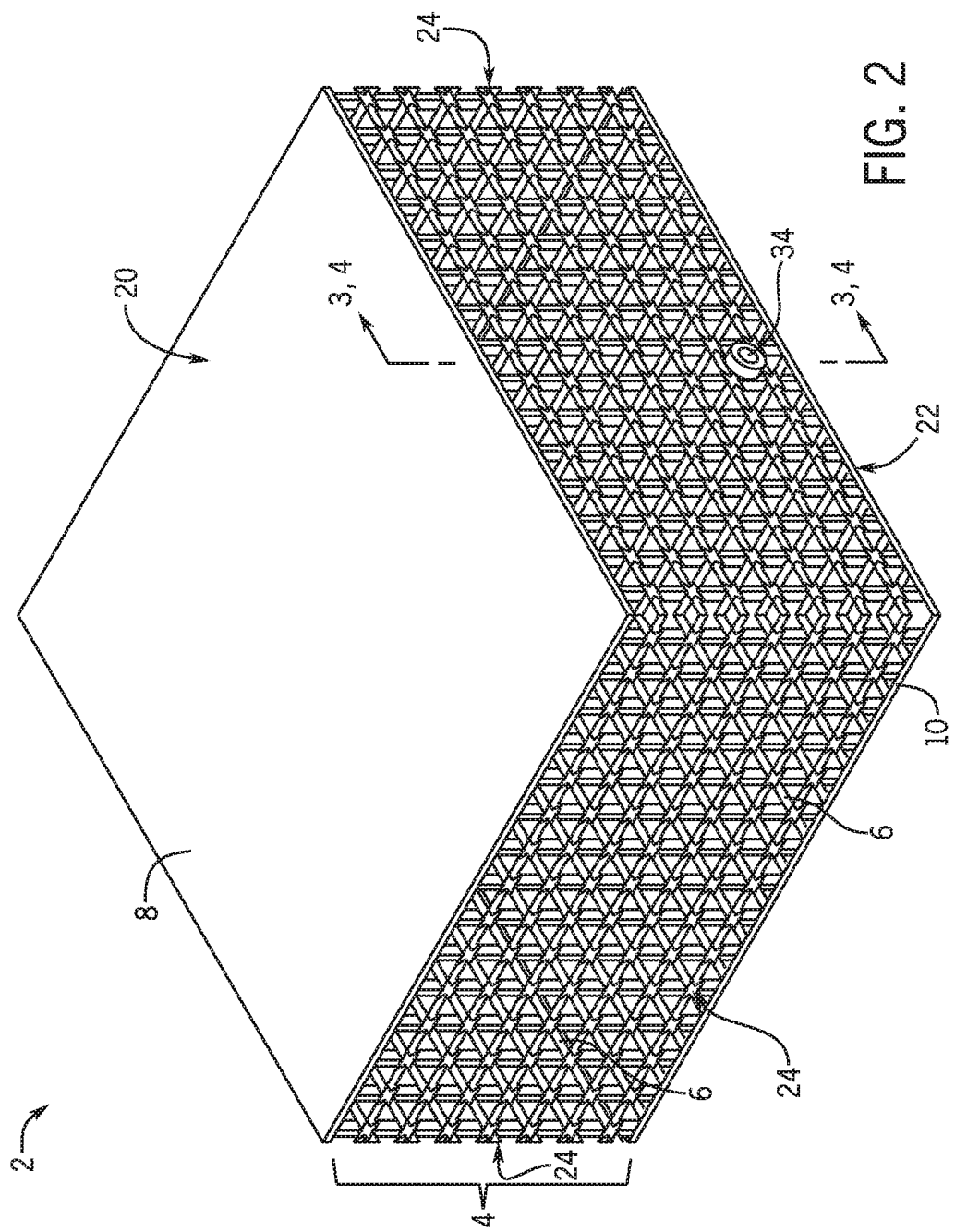
FIG. 2 is a perspective view of a printed vehicle component according to the present subject matter.
Figure 3:
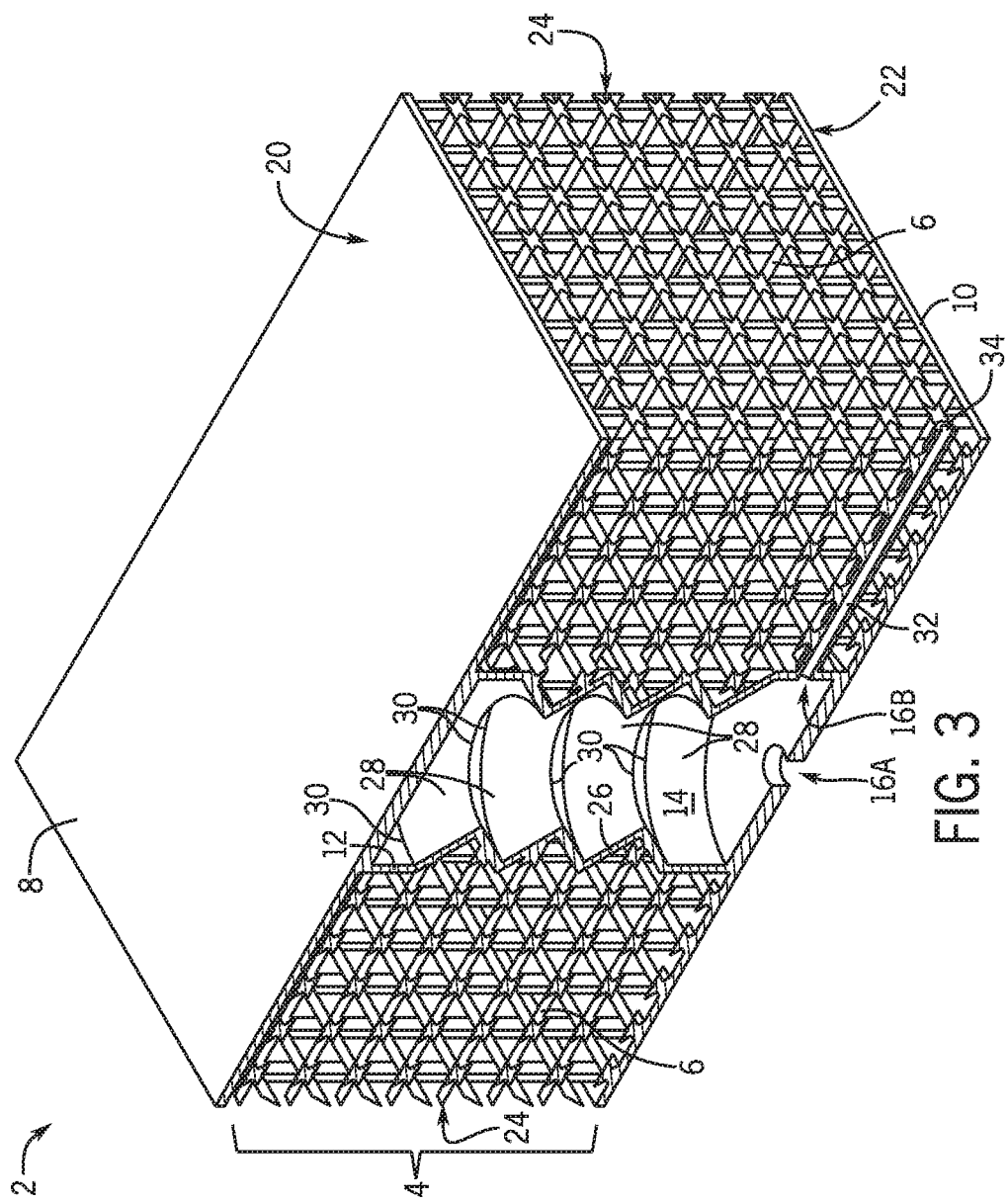
FIG. 3 is a perspective cross-sectional view of the printed vehicle component of FIG. 2 along line 3-3.

The present subject matter provides a three-dimensionally ("3D") printed component including one or more integral fluid chambers, and optionally integral tubes. The elements of the 3D printed component are integrally formed through 3D printing. The 3D printed component can be used to replace the typical elements of conventional massage seats in vehicles, which include separate and distinct foam layer, air bladders, and tubes that must be assembled together. 3D printing offers the ability to simplify massage seats, by printing an elastomeric material in a mesh-type or lattice-type configuration that defines the fluid chambers and optionally defines the tubes. The invention eliminates the need to incorporate premade air bladders and tubes in conventional foam structures, and eliminates the time and cost associated with their assembly. In addition, the properties of the regions of the lattice-type material surrounding the fluid chambers can be customized to offer targeted performance.

Referring to FIGS. 1-4, there is shown a singular and unitary printed component 2 made by 3D printing a flexible polymer material. The polymer material may include elastomers, and the polymer material can optionally be treated and painted. 3D printing is used form the various elements of the printed component 2 into an integral structure. The elements integrally printed as part of the printed component 2 include a network 4 of interconnected braces 6. The printed component 2 also includes one or more chambers 12 (also referred to herein as "fluid chambers" or "air bladders") within and contacting the network 4. The chamber 12 defines an interior 14 and one or more apertures 16 that provides access to the interior 14 of the chamber 12. The chamber 12 includes a top 36, a bottom 38, and a wall 26 extending between the top 36 and bottom 38 of the chamber 12. The printed component may also include a first sheet 8 (also referred to herein as "top sheet") and a second sheet 10 (also referred to herein as "bottom sheet"), although these are not required. If included, the first sheet 8 may define the top 36 of the chamber 12 and the second sheet 10 may define the bottom 38 of the chamber 12, although this is not required, e.g. when the first and second sheets 8, 10 are not included in the printed component 2. The network 4 may be sandwiched between and contact the first sheet 8 and the second sheet 10.

The printed component 2 (also referred to as "printed vehicle component") is formed by 3D printing and one or more printed components 2 may be incorporated into a vehicle seat, a vehicle steering wheel, or other vehicle assembly to provide a haptic sensation to a vehicle occupant. The haptic sensation is provided by a change in volume of the chamber 12 resulting from the introduction of fluid (e.g. air or other gas) through the aperture 16 and into the interior 14 of the chamber 12, and then releasing the fluid from the interior 14 of the chamber 12. The introduction of fluid into the interior 14 results in an increase in the volume of the interior 14 of the chamber 12, while releasing the fluid results in a decrease in the volume of the interior 14.

The introduction of fluid into, and releasing of fluid from the interior 14 of the chamber 12 may be performed for a desired duration, repeated a desired number of times, performed at a desired frequency, and/or performed at a desired intensity (i.e. control how much fluid is transported to and from the interior 14) to thereby provide a customizable haptic sensation to the occupant. The haptic sensation may include a single cycle (e.g. pulse) of transporting fluid to and from the interior 14 of the chamber 12, or may include multiple cycles (e.g. vibration/oscillation) of transporting fluid to and from the interior 14. The duration, number, frequency, and intensity of the one or more cycles may be controlled by the occupant through one or more controls. For example, fluid may be introduced into the one or more chambers 12 to increase the pressure therein, and held there for an extended, rather than short, period of time. This increase in pressure may provide for example, a desired hardness/firmness in a steering wheel to be handled by the occupant during driving. Alternatively, fluid may be repeatedly introduced into and expelled from the one or more chambers 12 at a high frequency in order to provide vibrations that massage the occupant.

The haptic sensation may be felt by the occupant most intensely in an area of the printed component 2 closest to the one or more chambers 12. The haptic sensation may be sensed by an occupant of the vehicle who is in contact with a vehicle assembly including the printed component 2. For example, an occupant may feel the haptic sensation if they are sitting on a seat that includes the printed component 2, or if they are touching a steering wheel including the printed component 2. The haptic sensation may provide a massage, an indication (e.g. a signal communication information), or other sensation to the occupant. A vibration produced by the printed component 2 may also produce a noise that is heard by a vehicle occupant. The haptic sensation may also be provided to an occupant not in contact with the vehicle assembly, but who can sense the haptic sensation through one or more intermediate mediums or components that contact the vehicle assembly including the printed component 2. For example, the printed component 2 may be included in a steering column of the vehicle, and vibrations may be transmitted from the steering column to the steering wheel, which is contacting the occupant. The occupant may sense the vibrations produced in the steering column even though the occupant is not contacting the steering column.

The printed component 2 may also be included in an assembly that is not included in a vehicle, for example a chair used in a home or office, a handle of a tool, a controller for a gaming console, or other structure.

The interconnected braces 6 are formed by 3D printing and form the network 4. The braces 6 are not particularly limited, and may include any structure or configuration as desired for a particular application. The braces 6 can include, but are not limited to posts, walls, spheres, blocks, threads, ribbons or the like, which are hollow or solid and which are interconnected to thereby form the network 4. The interconnected braces 6 are spaced from one another to thereby define open or closed cells 18 in the network 4. The cells 18 may be open cells if the braces 6 if the cells 18 are not completely surrounded by the braces 6. This may be accomplished if the braces 6 include posts as depicted in the figures. The cells 18 may be closed cells if they are completely surrounded by the braces 6. This may be accomplished if the braces 6 include walls.

The braces 6, and therefore the cells 18, may be regularly or irregularly spaced, regularly or irregularly sized, their orientation may be maintained or varied, or their structures may be varied or held constant throughout the network 4. These characteristics of the braces 6 and cells 18 may be intentionally varied in all or portions of the network 4 in order to modify one or more properties (e.g. strength, density, flexibility, softness, etc.) of the network 4 or a portion thereof as desired for a particular application. In a non-limiting embodiment, the size, shape, orientation, and structure of the braces 6 and cells 18 are maintained throughout the network 4. The compressibility of the printed component 2 may be adjusted for example, by changing the size of the cells 18, and/or by modifying the material elasticity and/or thickness of the braces 6.

As depicted in the figures, the braces 6 may include an array of crisscrossing posts, which are generally uniform in size and are spaced generally uniformly throughout the network 4 to form a three-dimensional lattice-type structure. The array of posts define an array of open cells 18, which are also uniformly sized and spaced. The braces 6 may include walls, which can be arranged to form closed cells 18 in a honeycomb structure, for example. Other configurations of braces 6 and cells 18 can be used.

When the first and second sheets 8, 10 are included, the first and second sheets 8, 10 may be integrally 3D printed with the network 4 and chamber 12 as shown and described herein. However, it will be understood that the first and second sheets 8, 10 may alternatively be separate and distinct structures from the network 4 and chamber 12 and may be adhesively bonded thereto, for example at a time after the network 4 and chamber 12 are formed by 3D printing.

As depicted in the figures, the network 4 is sandwiched between the first sheet 8 and the second sheet 10, which may be integral with the network 4 and formed by 3D printing. The first sheet 8 may define a top surface 20 of the printed component, and the second sheet 10 may define a bottom surface 22 of the printed component 2. The first and second sheets 8, 10 may be substantially flat with a smooth top surface 20 and bottom surface 22 respectively, as depicted in the figures; or the first and second sheets 8, 10 may be substantially not flat or smooth, and may be undulating and/or define rough top and bottom surfaces 20, 22.

Since the first sheet 8 and the second sheet 10 are integral with the network 4 (or adhesively bonded thereto), the first and second sheets 8, 10 thus provide a certain degree of increased strength and stiffness to the printed component 2 than if they were not included, by directly connecting with the top and bottom terminal ends of the braces 6 as depicted in the figures. If the braces 6 are not arranged or structured as depicted in the figures, e.g. spherical braces 6, then the top and bottom sheets 8, 10 may directly connect with top and bottom terminal braces 6 to provide increased strength and stiffness to the printed component 2.

Each of the first and second sheets 8, 10 may extend all the way to the sides 24 of the printed component 2 as shown, or may not extend all the way to the sides 24 of the printed component 2. In certain aspects, at least one of the first and second sheets 8, 10 do not extend all the way to the sides 24. Where the first or second sheets 8, 10 are not present, the printed component 2 may be softer to the touch. The printed component may be devoid of one or both of the first and second sheets 8, 10.

A thickness of the first sheet 8 and the second sheet 10 may be determined for a particular application, and can be the same or different between the first and second sheets 8, 10. As shown in the figures, the first and second sheets 8, 10 may partially define the chamber 12 (e.g. the top 36 and bottom 38 of the chamber 12) by directly connecting with a wall 26 that extends between the first and second sheets 8, 10.

The chamber 12 may be defined at the top 36 by a portion of the first sheet 8, at the bottom 38 by a portion of the second sheet 10, and between the top 36 and bottom 38 by a wall 26 extending between and contacting the first sheet 8 and the second sheet 10. Alternatively, such as if the printed component 2 does not include the first or second sheets 8, 10, the chamber 12 may be defined not by a portion of the first sheet 8 and a portion of the second sheet 10, but by top and bottom walls respectively. Although the top 36 and bottom 38 of the chamber 12 are shown as being thicker than the first and second sheets 8, 10, it will be understood that the top 36 and bottom 38 of the chamber 12 can be the same thickness, or thinner than the first and second sheets 8, 10.

Figure 5:
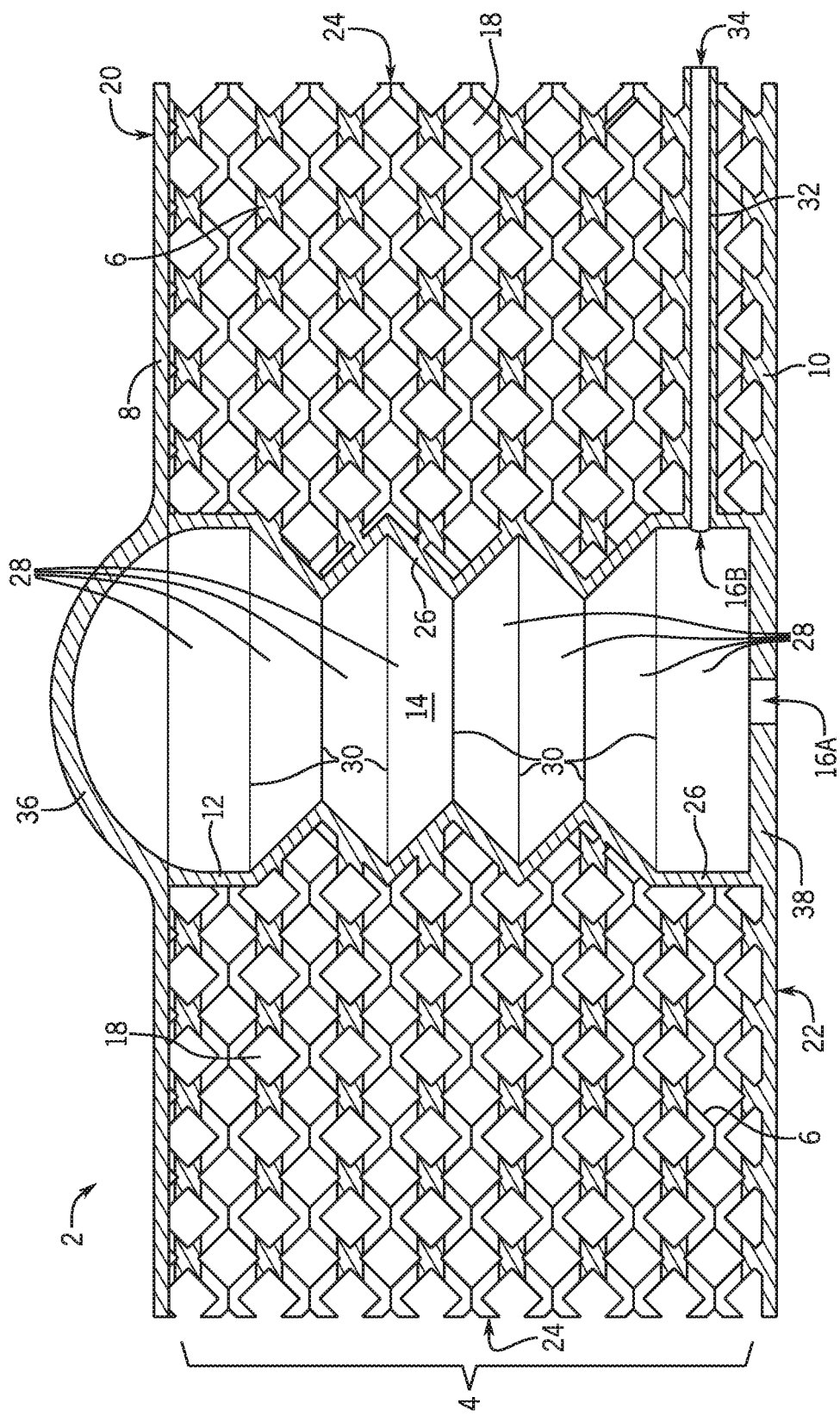
FIG. 5 is another side cross-sectional view of the printed vehicle component of FIG. 2 along line 4-4, with a chamber having an increased volume.

The chamber 12 may be configured to have a first volume (e.g. ambient volume) which may be a volume of the chamber 21 when a pressure in the interior 14 of the chamber 12 is at a first pressure (e.g. ambient pressure). The chamber 12 may be configured to expand to a second volume (e.g. expanded volume) that is greater that the first volume, when the pressure in the interior 14 of the chamber 12 increases toward a second pressure (e.g. greater than ambient pressure) that is greater than the first pressure. The volume of the chamber 12 may remain at the first volume and not increase to the second volume until the pressure in the interior 14 reaches a threshold, e.g. exceeds the second pressure, or the volume may linearly increase as the pressure in the chamber 12 linearly increases from the first pressure towards the second pressure. The chamber 12 may be configured to return to the first volume when the pressure in the interior 14 decreases back toward the first pressure. In one embodiment as depicted in FIG. 5, when the pressure in the interior 14 is increased to the second pressure and the volume of the chamber 12 is increased to the second volume, the top 36 of the chamber 12 may extend outward from the top surface 20 of the first sheet 8 and/or from the top and bottom terminal ends of the braces 6. This may be accomplished by modifying (e.g. decreasing) a thickness of the top 36 of the chamber 12 relative to the other elements of the printed component 2.

The chamber 12 may also be configured to contract to a third volume (e.g. contracted volume) that is less than the first volume, when the pressure in the interior 14 decreases toward a third pressure (e.g. less than ambient pressure) that is less than the first pressure. The volume of the chamber 12 may not decrease to the third volume until the pressure in the interior 14 falls below a threshold, e.g. the third pressure, or the volume may decrease as the pressure in the chamber 12 decreases from the first pressure towards the third pressure. The chamber 12 may be configured to return to the first volume when the pressure in the interior 14 increases back toward the first pressure.

A change in the volume of the chamber 12 between the first, second, and third volumes will result in an expansion or contraction of the network 4, and a corresponding movement of one or both of the top or bottom surfaces 20, 22 relative to the vehicle occupant. Such movement of the top and bottom surfaces 20, 22 provide the haptic sensation to the occupant.

In order for the chamber 12 to increase and decrease in volume, the wall 26 of the chamber 12 may be configured to change shape, e.g. the height of the wall 26 (i.e. up and down in the figures) may increase or decrease, or the wall 26 may bulge out towards, or contract from the left, right, front or back in the figures. Such change in the shape of the wall 26 may occur when there is an increase or decrease in the pressure in the interior 14 of the chamber 12.

Figure 4:
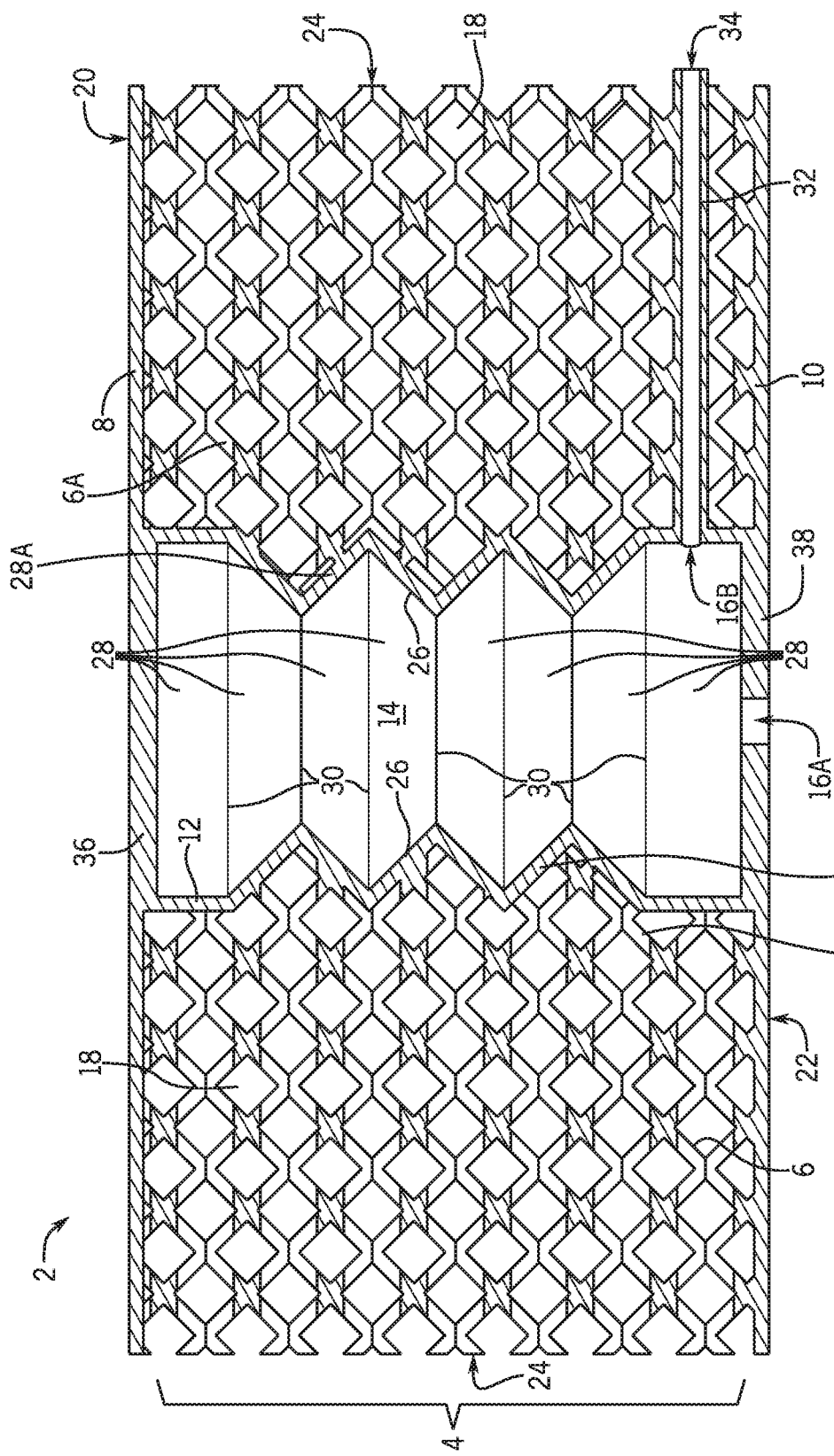
FIG. 4 is a side cross-sectional view of the printed vehicle component of FIG. 2 along line 4-4.

In order to change shape, the wall 26 may have an accordion-like configuration as depicted in the figures, including a plurality of panels 28 that contact each other at flexible joints 30. The joints 30 being flexible, may therefore allow the panels 28 to move relative to one another, where angles of the panels 28 changes with respect to each other when the pressure in the interior 14 is changed. As depicted, each panel 28 is arranged at an approximately right angles with adjacent panels 28. The angles between the panels 28 may increase or decrease as the pressure in the interior 14 increases or decreases, thus resulting in the wall 26 changing shape from the zig zag pattern depicted, to a straighter or more compact zig zag pattern, and thus producing an increase or decrease in the volume of the chamber 12. The panels 28 themselves might also be flexible to further increase or decrease the volume of the chamber 12. When the pressure in the interior 14 of the chamber 12 is at ambient pressure, the network 4 may provide for a uniform force displacement throughout the printed component 2. That is, the printed component 2 may have the same force displacement where the chamber 12 is located as where the chamber 12 is not located. When the pressure in the interior 14 of the chamber 12 is above ambient pressure, the braces 6 help to prevent compression when the chamber 12 is subject to compression. For example, as best seen in FIG. 4, some braces 6A extend between and contact an upward facing panel 28A and the first sheet 8. Other braces 6B extend between and contact a downward facing panel 28B and the second sheet 10. Such configuration supports the panels 28A and 28B to inhibit their movement upon being compressed.

Such an increase of decrease in the pressure in the interior 14 of the chamber 12 may result from transporting fluid (e.g. air or other gas) to or from the interior 14. The chamber 12 may include one or more apertures 16 through which the fluid is transported to or from the interior 14. The chamber 12 may define one aperture 16A arranged in the bottom sheet 10. Alternatively or additionally, the chamber 12 may define one aperture 16B arranged in the wall 26. If two apertures 16A and 16B are provided, one may be for transporting the fluid to the interior 14, and the other may be for transporting fluid from the interior 14. If only one aperture 16 is provided, the aperture 16 may be used for transporting fluid both to and from the interior 14.

The aperture 16 is fluidly connected to a fluid reservoir, which can provide fluid to, or accept fluid from the interior 14 of the chamber 12. A fluid pathway may be provided to transport the fluid to and from the interior 14. The fluid pathway may include one or more tubes, filters, pumps, chambers, tanks, or other fluid transportation structures that fluidly connect the interior 14 of the chamber 12 with the fluid reservoir. In a non-limiting embodiment, the fluid pathway may include a tube 32 as depicted in the figures. The tube 32 is formed by 3D printing and is integral with the other elements of the printed component 2. The tube 32 may extend through the network 4 of braces 6, from the aperture 16B in the wall 26, to the side 24 of the printed component 2, or may be differently arranged as desired. The tube 32 provides a connection 34 for fluid transport from the fluid reservoir to the interior 14 of the chamber 12. The connection 34 is on the side 24 of the printed component 2, rather than on the bottom of the printed component 2 as provided by aperture 16A.

The fluid may be forcibly or passively transported to or from the interior 14 of the chamber 12. A pump may be used to forcibly transport the fluid to and from the interior 14. Alternatively or in additionally, the chamber 12 may be elastic in nature so as to passively return to the first volume from the second and third volumes. This change in volume of the chamber 12 may result in fluid being delivered to or expelled from the interior 14 of the chamber 12, without having to forcibly transport fluid to or from the interior 14 of the chamber 12 using a pump.

The fluid may be air or other gas, or a liquid. The fluid reservoir may include a tank of compressed gas, the atmosphere, or other reservoir containing fluid.

The printed component 2 may be incorporated into a vehicle assembly, such as in a vehicle seat or steering wheel. When incorporated into a vehicle assembly, the printed component 2 may be arranged over a substrate, and covered by one or more cover/top layers, for example a leather sheet may be arranged over the printed component. A covering of a leather top layer will inhibit the printed component 2 from being seen by an occupant of the vehicle, but does not prevent the occupant from receiving the haptic sensation from the printed component 2. The printed component 2 may be coated with a coating layer, such as a pigmented layer or protective layer. The printed component 2 may be covered by other layers, coatings, components, or assemblies.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printed vehicle component comprising:
a network of interconnected braces defining an array of cells; and
a fluid chamber arranged within the network and including an aperture providing access to an interior of the chamber;
wherein the network and the chamber are integrally formed of a flexible polymer material.

2. The printed vehicle component according to claim 1, further comprising:
a first sheet; and
a second sheet;
wherein the network is sandwiched between and contacts the first sheet and the second sheet; and
wherein the first sheet and the second sheet are integrally formed with the network and the chamber and are formed from the flexible polymer material.

3. The printed vehicle component according to claim 2, wherein:
the chamber is defined by the first sheet, the second sheet, and a wall extending between and contacting the first sheet and the second sheet, and
the wall contacts the network.

4. The printed vehicle component according to claim 3, wherein the wall includes a plurality of panels that contact each other at flexible joints.

5. The printed vehicle component according to claim 4, wherein:
some of the braces contact and extend between upward facing panels and the first sheet; and
others of the braces contact and extend between downward facing panels and the second sheet.

6. The printed vehicle component according to claim 3, wherein:
the aperture is located in the wall, and
the printed component further comprises a tube extending between the aperture and an edge of the printed component.

7. The printed vehicle component according to claim 2, wherein the aperture is located only in one of the first sheet and the second sheet.

8. The printed vehicle component according to claim 2, wherein one of the first sheet and the second sheet do not extend all the way to each edge of the printed component.

9. The printed vehicle component according to claim 1, wherein:
when a pressure in the interior of the chamber is less than a predetermined threshold, a volume of the chamber is a first volume;
when the pressure in the interior of the chamber is greater than the predetermined threshold, a volume of the chamber is a second volume that is greater than the first volume.

10. The printed vehicle component according to claim 1, wherein the interior of the chamber is in fluid communication with a gas source via the aperture.

11. The printed vehicle component according to claim 1, wherein the printed vehicle component is included in a vehicle seat or vehicle steering wheel.

12. A method of providing a haptic sensation to a vehicle occupant from a printed component comprising:
a network of interconnected braces defining an array of cells, and
a chamber arranged within the network and including an aperture providing access to an interior of the chamber,
wherein the network and the chamber are integrally formed of a flexible polymer material, the method comprising:
transporting a fluid to the interior of the chamber via the aperture to thereby expand the chamber from a first volume to a second volume that is larger than the first volume; and transporting the fluid from the interior of the chamber via the aperture such that the chamber contracts from the second volume to the first volume wherein the occupant feels the chamber expanding from the first volume to the second volume and contracting from the second volume to the first volume.

13. The method according to claim 12, wherein a pressure in the chamber is increased by transporting the fluid to the interior of the chamber, and the pressure in the chamber is decreased by transporting the fluid from interior of the chamber.

14. The method according to claim 13, wherein:
the volume of the chamber is the first volume when the pressure in the chamber is below a threshold; and
the volume of the chamber expands from the first volume to the second volume only if the pressure in the chamber exceeds the threshold.

15. The method according to claim 12, wherein the haptic sensation is a massage, or a signal communicating information.

16. A method of making a vehicle assembly comprising:
three dimensionally printing with a flexible polymer material to produce a printed component including:
a network of interconnected braces defining an array of cells, and
a chamber arranged within the network and including an aperture providing access to an interior of the chamber,
wherein the network and the chamber are integral with one another,
arranging the printed component over a substrate; and
covering the printed component with a top layer.

17. The method according to claim 16, wherein:
the printed component further includes a first sheet and a second sheet,
the network is sandwiched between and contacts the first sheet and the second sheet,
the first sheet and the second sheet are integral with the network and the chamber,
the chamber is defined by the first sheet, the second sheet, and a wall extending between and contacting the first sheet and the second sheet, and
the wall contacts the network.

18. The method according to claim 17, further comprising fluidly connecting the chamber with a fluid reservoir via the aperture.

19. The method according to claim 18, wherein the aperture is located in only one of the first sheet and the second sheet.

20. The method according to claim 18, wherein:
the aperture is located in the wall, and
the printed component further includes a tube extending from the aperture and through the network, and connecting the interior of the chamber to the fluid reservoir.

* * * * *